United States Patent
Mushika et al.

[11] Patent Number: 5,844,394
[45] Date of Patent: Dec. 1, 1998

[54] STEPPING MOTOR CONTROLLER

[75] Inventors: Yoshihiro Mushika; Tohru Kawabata, both of Neyagawa; Yoshio Umeda, Kobe, all of Japan

[73] Assignee: Matsushita Electric Industrial Co., Ltd., Kadoma, Japan

[21] Appl. No.: 932,265

[22] Filed: Sep. 17, 1997

[30] Foreign Application Priority Data

Sep. 20, 1996 [JP] Japan .................................. 8-249492

[51] Int. Cl.$^6$ ........................................................ H02P 8/00
[52] U.S. Cl. ......................... 318/696; 318/685; 358/421
[58] Field of Search .................................. 318/696, 685; 358/421, 498, 296

[56] References Cited

U.S. PATENT DOCUMENTS

| 4,963,808 | 10/1990 | Torisawa et al. | 318/685 |
| 5,198,741 | 3/1993 | Shinada et al. | 318/696 |

FOREIGN PATENT DOCUMENTS

| 62-018995 | 1/1987 | Japan . |
| 02136100 | 5/1990 | Japan . |
| 04355657 | 12/1992 | Japan . |

Primary Examiner—Karen Masih
Attorney, Agent, or Firm—Renner, Otto, Boisselle & Sklar, P.L.L.

[57] ABSTRACT

The stepping motor controller of the present invention includes: a stepping motor including a rotor and an excitation coil; a drive section for supplying multiple-stage drive current to the excitation coil in response to an input command value, thereby enabling a micro step drive; a control section for controlling the stepping motor by varying the command value to be provided for the drive section; and a position detection control section for generating a detection signal in accordance with a rotation position of the rotor. The control section switches two operation modes of a first operation mode and a second operation mode, the control section varies the command value to be provided for the drive section based on a timing generated by the control section itself in the first operation mode, and the control section varies the command value to be provided for the drive section based on a timing corresponding to the detection signal generated by the position detection control section in the second operation mode, thereby controlling the stepping motor. The control section switches the two operation modes during a series of transportation operations for transporting the stepping motor from a start position to a target position, and the control section makes the stepping motor perform a coarse operation in the second operation mode and then switches the second operation mode into the first operation mode, thereby performing a micro step drive.

7 Claims, 7 Drawing Sheets

STEPPING MOTOR CONTROLLER

BACKGROUND OF THE INVENTION

1. Field of the Invention:

The present invention relates to a stepping motor controller, and more particularly relates to a stepping motor controller using an encoder.

2. Description of the Related Art:

A stepping motor has a forte for small-sizing, high torque, long lifetime and high resolution positioning with open loop control. Accordingly, a stepping motor is generally driven by an open loop control. However, such a drive method has problems such as loss of synchronism at the time of high-velocity rotation. Thus, various controllers for performing a closed loop control by additionally providing an encoder for a stepping motor (e.g., a brushless DC motor) have conventionally been proposed so as to be accommodated to a high-velocity rotation operation.

In U.S. Pat. No. 4,963,808, a configuration in which the control modes of a stepping motor are switched by a control section such that the stepping motor can be operated as a two-phase stepping motor in a two-phase stepping mode and as a DC motor in a closed loop mode, is described. In addition, a configuration in which the number of output pulses per rotation of an encoder is set to be an integral multiple of the number of rotor magnetic poles of a stepping motor, a state where the stepping motor is excited in a one-phase excitation is regarded as a reference state, and the excitation current to the stepping motor is switched every time a predetermined number of pulses have been detected from the encoder since the reference state was established, so as to realize a phase precision having no more than a predetermined error between the output signal of the encoder and the excitation current to the stepping motor without any particular adjustment, is also described in this patent.

However, when an object is desired to be transported to a target position at a high velocity and with a high precision as in the case of transporting an optical pickup in an optical disk device, for example, the following problems are encountered.

First, a high-velocity transportation and a high-precision positioning were incompatible purposes.

The reasons are as follows. Though a closed loop mode is suitable for a high-velocity transportation, a high-precision positioning cannot be realized easily in such a mode by taking advantage of the resolution characteristics of a stepping motor. Conversely, in a two-phase stepping mode in which positioning is realized with a high precision, it is difficult to realize a high-velocity transportation. Moreover, in order to improve the high-velocity rotation ability and the efficiency of a stepping motor in the closed loop mode, it is desirable to decrease the number of rotor magnetic poles of the stepping motor. Nevertheless, if the number of rotor magnetic poles is decreased, the positioning resolution is adversely deteriorated. Thus, it has long been sought to fulfill these incompatible requirements. However, a configuration for satisfying these requirements is not described at all in U.S. Pat. No. 4,963,808 cited above.

Second, though it is possible to switch a closed loop control and an open loop control during a series of transportation operations in order to simultaneously fulfill the two purposes of high-velocity transportation and high-precision positioning, the mode switching during the series of transportation operations generated an impact vibration and the like before and after the mode switching. Such an impact vibration prevented an object from being smoothly transported to a target position at a high velocity and with a high precision.

SUMMARY OF THE INVENTION

A stepping motor controller according to the present invention comprises: a stepping motor including a rotor and an excitation coil; a drive section for supplying multiple-stage drive current to the excitation coil in response to an input command value, thereby enabling a micro step drive; a control section for controlling the stepping motor by varying the command value to be provided for the drive section; and a position detection control section for generating a detection signal in accordance with a rotation position of the rotor, wherein the control section switches two operation modes of a first operation mode and a second operation mode, the control section varies the command value to be provided for the drive section based on a timing generated by the control section itself in the first operation mode, and the control section varies the command value to be provided for the drive section based on a timing corresponding to the detection signal generated by the position detection control section in the second operation mode, thereby controlling the stepping motor, and wherein the control section switches the two operation modes during a series of transportation operations for transporting the stepping motor from a start position to a target position, and the control section makes the stepping motor perform a coarse operation in the second operation mode and then switches the second operation mode into the first operation mode, thereby performing a micro step drive.

In one embodiment of the present invention, the control section selectively uses the two operation modes depending upon a transportation amount over which the stepping motor is transported from the start position to the target position, the control section drives the stepping motor only in the first operation mode if the transportation amount is smaller than a predetermined value, and the control section drives the stepping motor by switching between the second operation mode and the first operation mode if the transportation amount is equal to or larger than the predetermined value.

In another embodiment of the present invention, the control section switches the second operation mode into the first operation mode based on a time when a phase of an output signal of the position detection control section is varied; and a rotation position of the rotor at an instant of the switching is substantially matched with a stability point at which the rotor is electromagnetically stabilized and rests in the micro step drive.

In still another embodiment of the present invention, when the stepping motor is driven in the second operation mode, the control section provides a first sequence of command values for the drive section, thereby accelerating the stepping motor at a first acceleration, and subsequently provides a second sequence of command values for the drive section, thereby accelerating the stepping motor at a second acceleration substantially lower than the first acceleration, and then provides a third sequence of command values for the drive section, thereby decelerating the stepping motor.

Another stepping motor controller according to the present invention comprises: a stepping motor including a rotor and a plurality of excitation coils; a drive section for supplying drive current to the respective excitation coils in response to an input command value; a control section for step driving the stepping motor by varying the command value to be provided for the drive section; a position detection control section for outputting a detection signal by detecting a rotation angle of the rotor at a resolution of $\alpha°$ or less; and a decision control section for determining whether or not the stepping motor is out of synchronism, wherein the control section varies the command value corresponding to a rotation of the stepping motor by the resolution of $\alpha°$ or more, and the decision control section determines whether or not the stepping motor is out of synchronism in accordance with a variation of the detection signal before and after the command value has been varied.

In one embodiment of the present invention, the stepping motor controller further comprises a transported object to which a driving force is transmitted by the stepping motor so as to be transported via a predetermined route; and a stopper for coming into contact with the transported object, thereby limiting a transportation range of the transported object, wherein the control section drives the stepping motor in a direction in which the transported object is contacted with the stopper, and wherein after the decision control section has determined the loss of synchronism, the control section stops the drive of the stepping motor toward the direction or reverses the direction of the drive.

In one embodiment of the present invention, the stepping motor controller further comprises a transported object to which a driving force is transmitted by the stepping motor so as to be transported via a predetermined route; and a first stopper and a second stopper for coming into contact with the transported object, thereby limiting a transportation range of the transported object, wherein the first and the second stoppers are provided so as to be spaced via a predetermined distance therebetween, a hardness of the first stopper being lower than a hardness of the second stopper, and wherein the control section controls the stepping motor in a direction in which the transported object is contacted with the first stopper, and wherein, after the decision control section has determined the loss of synchronism, the control section controls the stepping motor in a direction in which the transported object is contacted with the second stopper, and wherein, after the decision control section has determined the loss of synchronism again, the control section stops or reverses the drive of the stepping motor, and wherein a velocity of the transported object immediately before the transported object comes into contact with the second stopper is made lower than a velocity of the transported object immediately before the transported object comes into contact with the first stopper.

Hereinafter, the functions or the effects to be attained by the present invention will be described.

In one aspect of the present invention, the stepping motor controller is configured so as to make the control section switch between the first operation mode and the second operation mode. Specifically, the control section controls the stepping motor in the second operation mode in response to a detection signal of the position detection control section for detecting the rotation position of the rotor, and then switches the second operation mode into the first operation mode for performing a micro step drive.

In this way, first, the rotor is subjected to a coarse drive by a closed loop control so as to be transported to the vicinity of a target position at a high velocity. Next, the drive is switched into a micro step drive in an open loop control so that the rotor is located at the target position with a high precision. The stepping motor can be transported to the target position at a high velocity and with a high precision in this manner.

In another aspect of the present invention, the stepping motor controller is configured such that, at the time when the operation mode of the control section is switched from the second operation mode into the first operation mode, the rotation position of the rotor is substantially matched with a stability point where the rotation position of the rotor is electromagnetically stabilized.

In this way, since the deceleration force which has been applied on the rotor becomes very small at the time of switching, it is possible to prevent the rotor from being swung backward at the time of switching the operation modes.

In still another aspect of the present invention, the stepping motor controller changes a sequence of command values, which the control section provides for the drive section, before the operational state of the stepping motor is switched from an acceleration operation into a deceleration operation, thereby reducing the drive current to be supplied to the stepping motor.

As a result, the velocity variation at the transition from the acceleration operation into the deceleration operation is made smoother, so that the impact vibration owing to the velocity variation is considerably reduced.

Thus, the invention described herein makes possible the advantage of providing a stepping motor controller which simultaneously makes full use of both the position control resolution and the high-velocity transportation ability of a stepping motor and considerably reduces the vibration at the transition of operation modes.

This and other advantages of the present invention will become apparent to those skilled in the art upon reading and understanding the following detailed description with reference to the accompanying figures.

DESCRIPTION OF THE PREFERRED EMBODIMENTS

Hereinafter, the embodiments of the stepping motor controller of the present invention will be described with reference to the accompanying drawings.

In the following first to third examples, the stepping motor controller of the present invention is applied to driving a head in an optical disk drive apparatus, and the transported object to be driven by the stepping motor is the head. However, the present invention is not limited to such an application, but is applicable to various other types of stepping motor controllers.

EXAMPLE 1

Hereinafter, the first example of the present invention will be described with reference to FIG. 1, FIG. 2 and FIGS. 3A to 3C.

Figure 1:
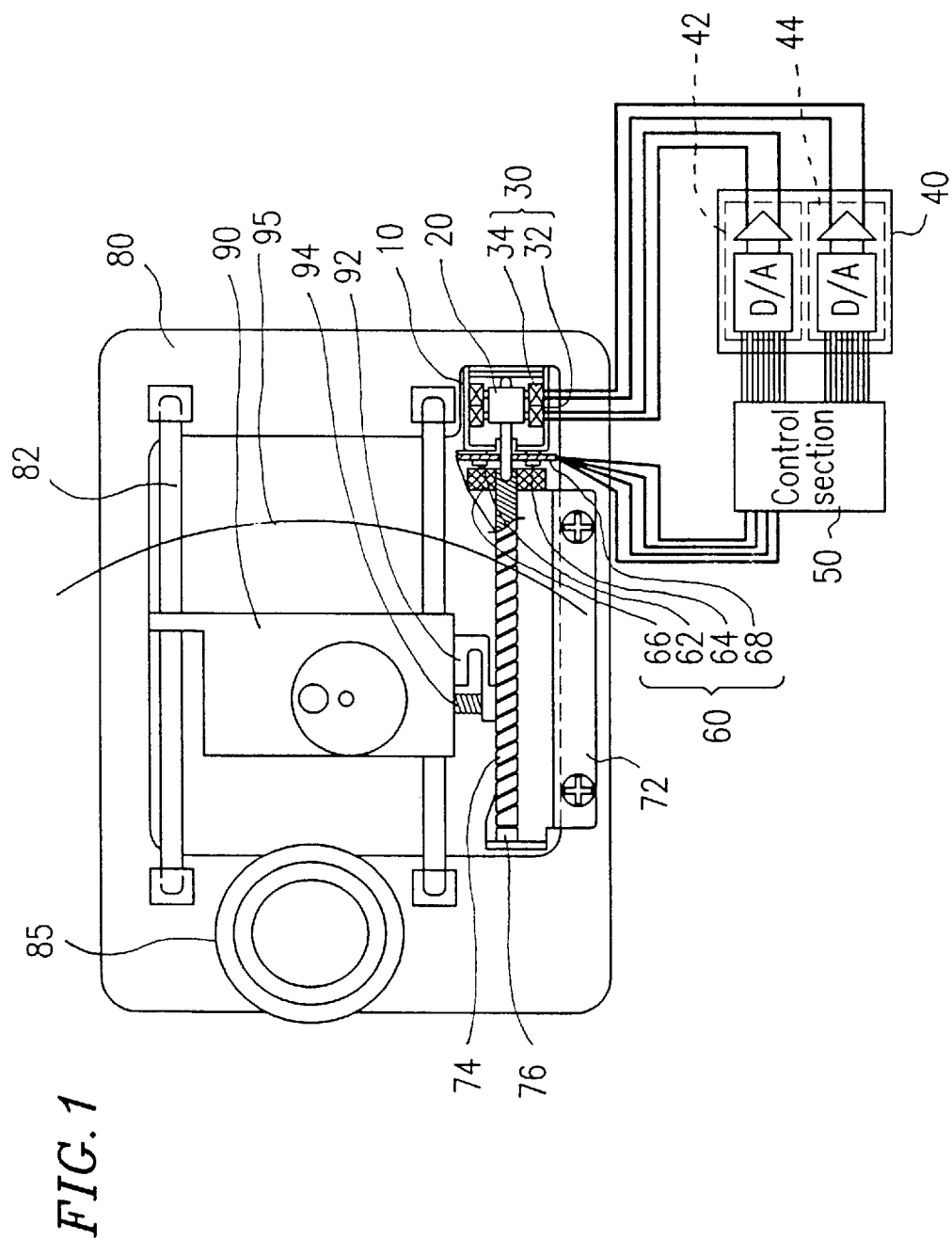
FIG. 1 is a view showing a configuration of an optical disk drive apparatus as an exemplary stepping motor controller in a first example of the present invention.

FIG. 1 is a schematic view showing an exemplary configuration of an optical disk drive apparatus to which the first example of the present invention is applied. In this example, an illustrative stepping motor 10 of a two-phase PM type having a step angle of 18° at the time of two-phase excitation will be described.

The stepping motor 10 includes a rotor 20 and two-phase excitation coils 30.

The rotor 20 includes a permanent magnet in which five pairs of N and S poles are magnetized so as to be spaced via an angular gap of 72° therebetween at a substantially equal pitch in the circumferential direction thereof. The two-phase excitation coils 30 include an A-phase stator 32 and a B-phase stator 34. The A-phase stator 32 and the B-phase stator 34 are provided with magnetic poles in the form of yokes at the positions facing the rotor 20 in order to generate five pairs of N and S poles at a period of 72° when the excitation coils become conductive. The magnetic poles in the form of yokes for the A-phase stator 32 and the B-phase stator 34 are disposed so as to deviate from each other by 18°.

A drive section 40 includes a pair of current drivers on two independent channels, i.e., an A-phase current driver 42 and a B-phase current driver 44. The A-phase current driver 42 and the B-phase current driver 44 each receive digital data representing a current command amount which has been output from a control section 50 and respectively supply drive current to the A-phase stator 32 and the B-phase stator 34 based on the values of the data, thereby driving the stepping motor 10.

Specifically, each of the current drivers 42 and 44 includes a D/A converter and an amplifier. The D/A converter converts the digital data input from the control section 50 into an analog signal, for example. The amplifier amplifies the analog signal produced by the D/A converter, for example.

An encoder 60 includes: a pair of sensors on two channels, i.e., an A-phase sensor 62 and a B-phase sensor 64; an encoder magnet 66; and a digitizer circuit (not shown). The A-phase sensor 62 and the B-phase sensor 64 are implemented as hole devices, for example. In the encoder magnet 66, ten N and S poles in total are magnetized at a period of 72° in the circumferential direction thereof.

The encoder 60 outputs five pulses per rotation (at a period of 72°) which have been digitized in accordance with the rotation of the rotor 20.

The A-phase sensor 62 and the B-phase sensor 64 are mounted on a printed circuit board 68 such that the mount angle thereof becomes 18±10° or less (equivalent to an electric angle of 90±50° or less) about the motor rotation axis. The printed circuit board 68 is fixed on a flange 72. The encoder magnet 66 is engaged with a lead screw 74 and is adhered and fixed after the relative mount angle thereof with respect to the rotor 20 has been adjusted.

The control section 50 is formed as a digital signal processor (DSP), for example. The control section 50 may receive the output signal of the encoder 60 and output digital data representing current command values to the drive section 40.

The control section 50 may perform a control by switching a first operation mode M1 and a second operation mode M2.

In the first operation mode M1, the control section 50 outputs digital data representing current command values to the drive section 40 based on a timing signal generated by the control section 50 itself, thereby performing a micro step drive in accordance with the closed loop control.

More specifically, the ratio of the current to be supplied to the A-phase stator 32 and the B-phase stator 34 of the stepping motor 10 is varied, thereby performing the micro step drive and controlling the stability angle of the rotor 20 with a high resolution.

Since the relationship between the stability angle of the rotor 20 and the current ratio depends upon the states of the magnetic circuit and the load of the stepping motor 10, current command values providing rotor stability angles at regular intervals are determined beforehand as functions or a table. For example, in the case where a micro step drive is performed at 0.6° by dividing a step angle of 18° into 32 sections, a table is formed so as to generate data representing 8-bit current command values with respect to the data representing 32-stage (i.e., 5-bit) step angle commands. By incrementing or decrementing the data representing a step angle command, the stepping motor 10 is driven in a micro step manner to an arbitrary rotation direction.

In the second operation mode M2, the control section 50 performs a closed loop control for outputting digital data representing current command values to the drive section 40 in response to the output signal of the encoder 60. The stepping motor 10 and the encoder 60 have been provided so as to satisfy a particular phase relationship. The phase relationship will be described later with reference to FIG. 2.

The configuration of the peripheral components around the optical disk will be further described below.

The lead screw 74 is integrally coupled with the output axis of the stepping motor 10 together with the encoder magnet 66, and is axially secured in a rotation-free state on the flange 72 via a bearing 76. The flange 72 is fixed on a chassis 80. A head 90 includes an actuator (not shown) which can slide and rotate around an axis, and optically records and reproduces information onto/from an optical disk 95. One end of a nut piece 92 attached to the head 90 is engaged with a groove of the lead screw 74 so as to be energized by a spring 94. Consequently, the head 90 can be linearly reciprocated and driven along a guide shaft 82 as the stepping motor 10 rotates. The optical disk 95 is rotationally driven by a spindle 85. In transporting the head 90 to a target position, the transportation direction and the transportation amount are determined based on the address of a present position (start position) which has been written on the optical disk 95 and the address of the target position. The control section 50 performs a control operation for the stepping motor 10 in accordance with the transportation direction and the transportation amount.

Figure 2:
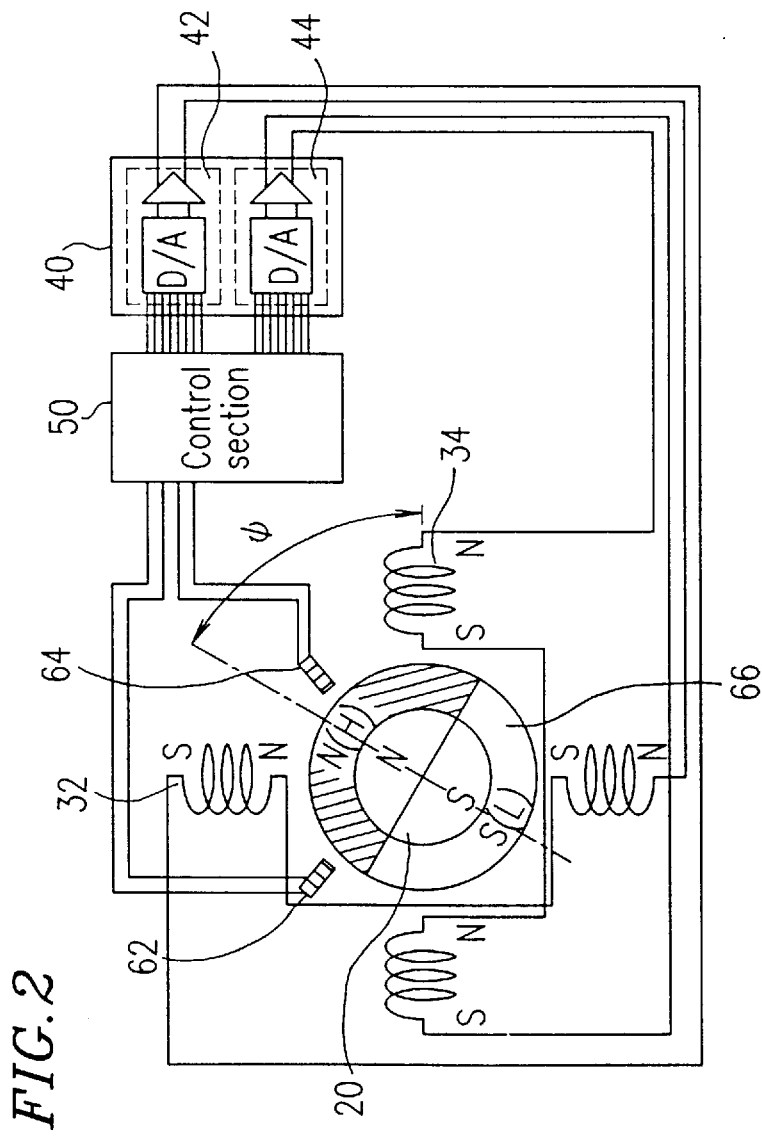
FIG. 2 is a view showing a stepping motor 10 and peripheral devices thereof which are used in the stepping motor controller in the first example of the present invention.

FIG. 2 illustrates the stepping motor of the present example in more detail.

In FIG. 2, the rotor 20 of the stepping motor 10 rotates integrally with the encoder magnet 66 of the encoder 60. When each of the A-phase sensor 62 and the B-phase sensor 64 of the encoder 60 detects the N-pole portion (hatched portion) of the encoder magnet 66, the sensor outputs a "HIGH" signal. On the other hand, when the sensor detects the S-pole portion thereof, the sensor outputs a "LOW" signal.

When the excitation direction of each of the A-phase stator 32 and the B-phase stator 34 of the stepping motor 10 is equal to the direction shown by N and S in each coil portion in FIG. 2, such an excitation direction is represented as "positive". On the other hand, when the excitation direction is opposite to that shown in FIG. 2, such a direction is represented as "negative". The "phase switching positions" at which the outputs of the encoder 60 are switched between HIGH and LOW are set so as to be substantially matched with the stability points at which the rotor 20 is electromagnetically stabilized to rest when the stepping motor 10 is driven in a two-phase excitation. Assuming the angular position of the rotor 20 to be represented by $\psi$ as shown in FIG. 2, the four points at which $\psi=45°$, $135°$, $225°$ and $315°$ correspond to the phase switching points. Also, these points are "dead points" at which the rotor 20, in a rest state, cannot be actuated by the second operation mode M2. Thus, when the rotor 20 is actuated, the control section 50 is required to first perform a micro step drive in the first operation mode M1 in order to transport the rotor 20 to an angular position other than the dead points and then to perform a transportation operation in the second operation mode M2.

Figure 3A:
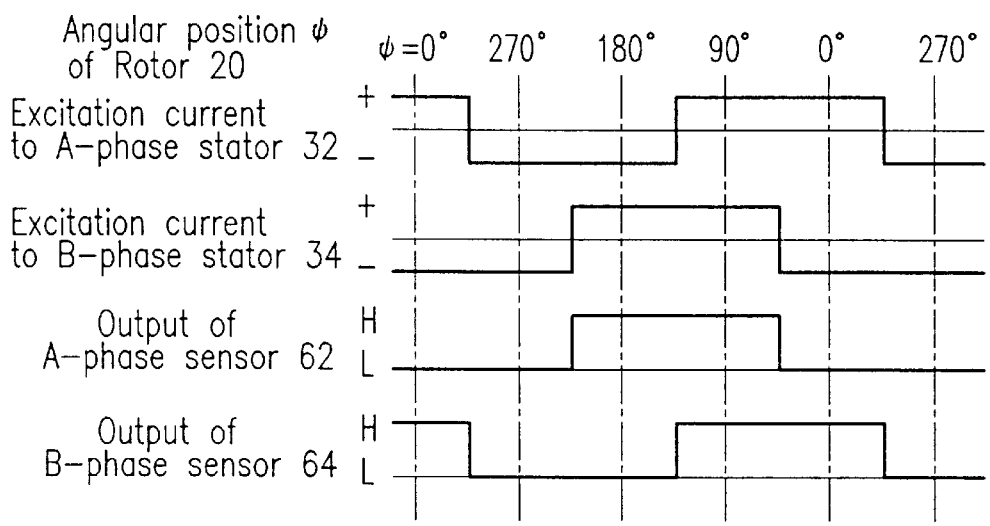
FIGS. 3A and 3B are charts showing the phase relationships between the excitation phases of the stepping motor 10 and the outputs of an encoder 60 which are used in the stepping motor controller in the first example of the present invention.
Figure 3C:
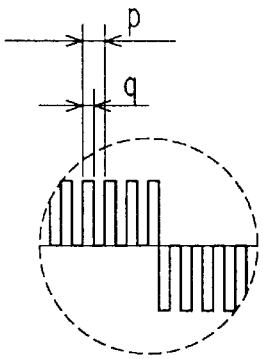
FIG. 3C illustrates excitation current to the A-phase stator 32 on a large scale.
Figure 3B:
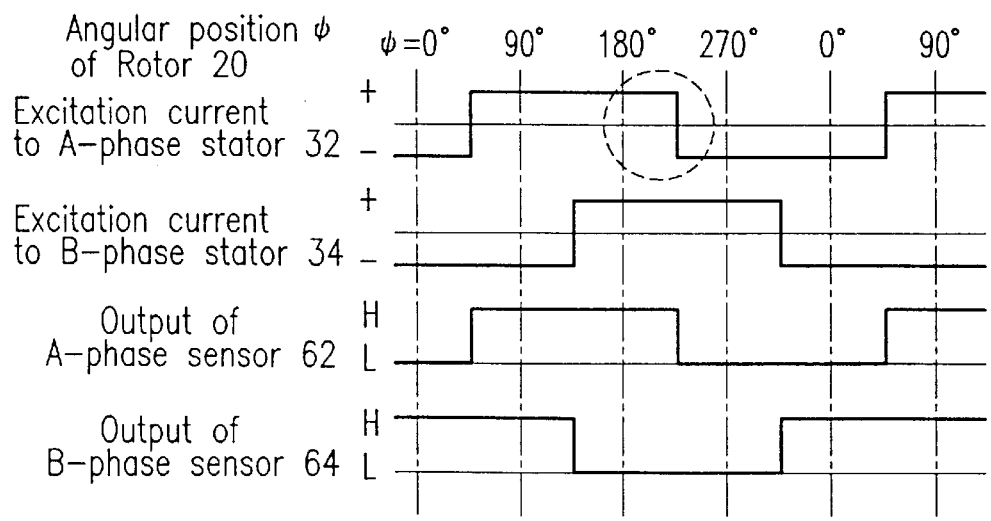

FIGS. 3A and 3B are charts illustrating the phase relationships between the excitation phases of the stepping motor 10 and the outputs of the encoder 60 in the second operation mode M2. The angles indicated in FIGS. 3A and 3B are not actual rotation angles, but are represented as electric angles having a phase period of 360°.

FIG. 3A illustrates the phase relationship between the excitation phases of the stepping motor 10 and the outputs of the encoder 60 when the rotor 20 is rotated in a clockwise direction.

The control section 50 performs a control such that the B-phase stator 34 is excited in a positive direction when the output of the A-phase sensor 62 is HIGH ($\psi=45°$ to $225°$), and that the B-phase stator 34 is excited in a negative direction when the output of the A-phase sensor 62 is LOW ($\psi=225°$ to $45°$) Also, the control section 50 performs a control such that the A-phase stator 32 is excited in the positive direction when the output of the B-phase sensor 64 is HIGH ($\psi=-45°$ to $135°$), and that the A-phase stator 32 is excited in the negative direct on when the output of the B-phase sensor 64 is LOW ($\psi=135°$ to $-45°$).

FIG. 3B illustrates the phase relationship between the excitation phases of the stepping motor 10 and the outputs of the encoder 60 when the rotor 20 is rotated in a counterclockwise direction.

The control section 50 performs a control such that the A-phase stator 32 is excited in the positive direction when the output of the A-phase sensor 62 is HIGH ($\psi=45°$ to $225°$), and that the A-phase stator 32 is excited in the negative direction when the output of the A-phase sensor 62 is LOW ($\psi=225°$ to $45°$). Also, the control section 50 performs a control such that the B-phase stator 34 is excited in the negative direction when the output of the B-phase sensor 64 is HIGH ($\psi=45°$ to $135°$), and that the B-phase stator 34 is excited in the positive direction when the output of the B-phase sensor 64 is LOW ($\psi=135°$ to $315°$).

FIG. 3C additionally illustrates excitation current to the A-phase stator 32 on a large scale. In actuality, the amount of the excitation current to the stators 32 and 34 is controlled in accordance with a pulse width modulation (PWM) control. The digital data representing the current command values output by the control section 50 to the drive section 40 is transmitted at a sufficiently higher frequency than the response frequency of the motor, and the period p of the PWM is about 10 $\mu$s. In addition, by setting the duty ratio d=q/p to be variable in the range from 0 to 1, the current amount is controlled. The duty ratio is controlled in accordance with the conditions selected from the present position, the present velocity, the target position, the target velocity and the rotation direction of the stepping motor 10, the operation mode of the control section 50 and the like, thereby determining the torque generated in the stepping motor 10. By controlling the digital data representing the current command values output by the control section 50 to the drive section 40 in this way, both the amplitudes and the timings of the excitation current to be supplied to the A-phase and the B-phase stators 32 and 34 can be substantially controlled.

Figure 4:
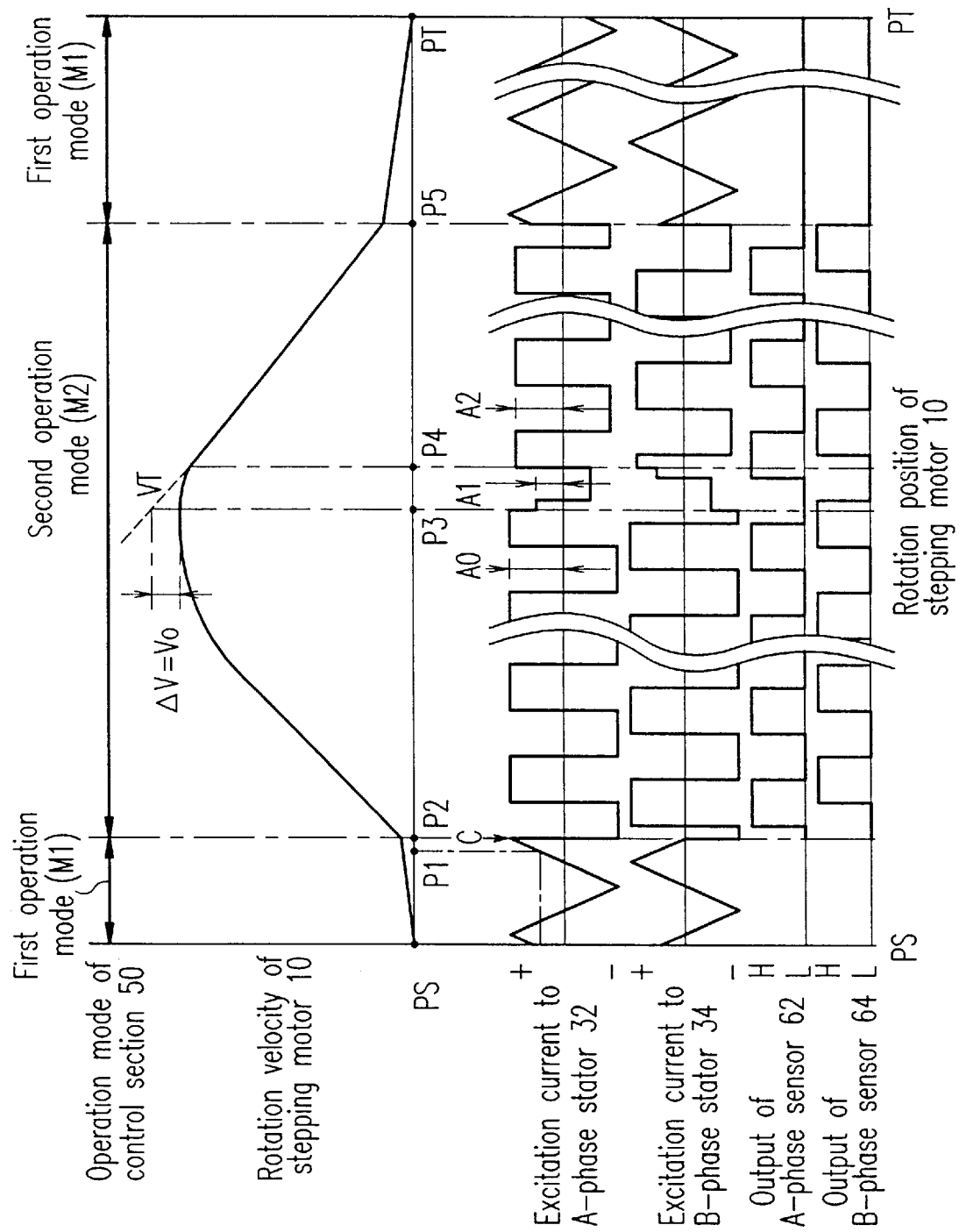
FIG. 4 is a diagram for illustrating the transportation control operation of the stepping motor 10 in the stepping motor controller in the first example of the present invention.

FIG. 4 illustrates the control operation of the stepping motor in the optical disk drive apparatus having the above-described configuration.

In FIG. 4, the axis of the abscissas represents the rotation positions of the stepping motor 10. Specifically, in FIG. 4, the left end abscissa represents a start position PS of the stepping motor 10 and the right end abscissa represents a target position PT thereof. On the other hand, the axis of the ordinates represents the rotation velocities of the stepping motor 10 at the respective rotation positions, the excitation current to be supplied to the A-phase and the B-phase stators 32 and 34, and the output signals of the A-phase and the B-phase sensors 62 and 64 of the encoder 60, respectively. For the purpose of illustration, the scales of these axes are appropriately expanded or shrunk.

When the stepping motor 10 is actuated for transporting the head 90 to the target position PT, the control section 50 compares the address of the present position written on the optical disk 95 with the address of the target position PT, thereby determining the rotation direction of the stepping motor 10. FIG. 4 illustrates a clockwise rotation.

Next, the control section 50 selectively uses the two operation modes in accordance with the transportation amount from the start position PS to the target position PT. If the transportation amount is very small, only the micro step drive is performed in the first operation mode M1 until the target position. However, if the transportation amount is equal to or larger than a predetermined amount, the transportation is performed by switching the operation modes in the order of the first operation mode M1, the second operation mode M2 and the first operation mode M1.

Hereinafter, the latter operation in which the transportation amount is a predetermined amount or more will be described.

In the case where the transportation amount from the start position PS to the target position PT is a predetermined amount or more, the transportation operation is divided into the following three stages. That is to say, in the first stage, an initial transportation operation is performed in the first operation mode M1. Next, in the second stage, a coarse operation is performed in the second operation mode M2. Finally, in the third stage, a transportation operation in the first operation mode M1 is performed again.

The control section 50 first selects the first operation mode M1, thereby rotating the stepping motor 10 by the micro step drive in the clockwise direction at a number of times corresponding to the predetermined number of pulses. The predetermined number of pulses is set so as to remove a substantial backlash from a drive transmission system for coupling the stepping motor 10 with the head 90. A value required for suppressing the impact vibration caused by this factor at the time of actuation is set beforehand. For example, in the case where the predetermined number of pulses is set at 32 in the 32-division micro step drive, the motor 10 is transported to a position P1 at which the excitation current to the stators 32 and 34 has been varied over one period as shown in FIG. 4 and then a backlash is removed from the drive transmission system. Thereafter, the micro step drive is continued until a predetermined excitation state is established as indicated by the arrow C. This is done in order to locate the rotor 20 beforehand at a predetermined phase in the first operation mode M1 and to actuate the motor 10 in the second operation mode M2 with certainty while avoiding the dead points in the second operation mode M2. It is assumed that the excitation state indicated by the arrow C is a state where either one phase of the A-phase stator 32 and the B-phase stator 34 has been excited to a maximum point and where the rotation torque in the second operation mode M2 becomes maximum.

The control section 50 switches the operation mode from the first operation mode M1 into the second operation mode M2 at a position P2 where the excitation state indicated by the arrow C first appears after the motor 10 has passed the position P1.

In the second operation mode M2, the control section 50 provides a first sequence of command values to the drive section 40 in accordance with the output signals of the A-phase sensor 62 and the B-phase sensor 64 of the encoder 60. In response thereto, the drive section 40 excites the B-phase stator 34 in positive/negative directions in accordance with the output HIGH/LOW of the A-phase sensor 62 and similarly excites the A-phase stator 32 in the positive/negative directions in accordance with the output HIGH/LOW of the B-phase sensor 64. In this case, the substantial magnitude of the excitation current is AO and the stepping motor 10 is accelerated clockwise by a strong acceleration force. This acceleration is referred to as a first acceleration.

The time at which the deceleration of the stepping motor 10 is started is a time at which the stepping motor 10 has a predetermined velocity at a position P5 where the operation mode of the control section 50 is switched from the second operation mode M2 into the first operation mode M1. Thus, a braking distance required for the deceleration is determined beforehand and the deceleration is set to be started at a point where the remaining distance becomes equal to the braking distance.

More specifically, the control section 50 calculates the rotation position of the stepping motor 10 by counting the output signals of the A-phase sensor 62 or the B-phase sensor 64 and calculates the remaining transportation amount by comparing the rotation position with the position P5. The target velocity VT corresponding to the remaining transportation amount is determined as indicated by the broken lines. On the other hand, the rotation velocities of the stepping motor 10 at the respective points are calculated from the inverse numbers of the period times of the output signals of the A-phase sensor 62 or the B-phase sensor 64 of the encoder 60.

At a position where the deviation ΔV between the target velocity VT and the rotation velocity V at the point becomes smaller than a predetermined value V0 (i.e., at the position P3), the control section 50 changes the sequence of command values to be provided for the drive section 40 from the first sequence into a second sequence in order to change the acceleration into a second acceleration. In this way, the drive section 40 lowers the amount of the current to be supplied to the stators 32 and 34 from A0 to A1, while maintaining the switching timing relationships between the stators 32 and 34 and the sensors 62 and 64 such that the drive direction of the stepping motor 10 is constant. The value of A1 is set at an optimum value which has been empirically determined to remove a backlash generated in the drive transmission system coupling the stepping motor 10 with the head 90 when the stepping motor 10 changes from the acceleration operation into the deceleration operation with a minimum impact.

At a position P4 where the deviation ΔV becomes zero, the control section 50 changes the sequence of command values to be provided for the drive section 40 from the second sequence into a third sequence. In response thereto, the drive section 40 excites the stators 32 and 34 and decelerates the motor 10 so as to generate a rotation force in a counterclockwise direction in the stepping motor 10. In this case, the control section 50 excites the A-phase stator 32 in the positive/negative directions in accordance with the output HIGH/LOW of the A-phase sensor 62 and similarly excites the B-phase stator 34 in the negative/positive directions in accordance with the output HIGH/LOW of the B-phase sensor 64. The control section 50 continues the deceleration operation, while controlling the current amount A2 such that a position precision and a velocity precision within predetermined ranges can be obtained at a position P5 where the second operation mode M2 is completed.

After the stepping motor 10 has passed the position P5, the control section 50 performs a micro step drive in the first operation mode M1 again. More specifically, at a point in time when the switching point (i.e., the leading edge or the trailing edge) of the output signal of the A-phase sensor 62 or the B-phase sensor 64 of the encoder 60 is detected for the first time, the operation mode is switched from the second operation mode M2 into the first operation mode M1. In this case, by making the excitation current to the stators 32 and 34 satisfy a predetermined relationship before and after the operation modes are switched, the generation of an impact vibration is prevented. For example, at the instant that the second operation mode M2 is completed at the time synchronous with the trailing edge of the B-phase sensor 64 as shown in FIG. 4, the rotation position of the rotor 20 is located at a position where ψ=−45° shown in FIG. 2. In this case, when the first operation mode M1 is started, excitation current having the same magnitude in the positive direction is supplied to the A-phase stator 32 and the B-phase stator 34, thereby setting the stability point of the rotor 20 at ψ=−45° so as to match the point with the present position. Thus, at the point, the rotation torque owing to the electromagnetic force becomes zero. Accordingly, the position becomes a stability point where the rotor 20 is electromagnetically stabilized. Consequently, the instant the second operation mode M2 is switched into the first operation mode M1, the deceleration force which has been applied on the rotor 20 until then becomes very small. By weakening the deceleration force to be applied to the rotor 20 before the rotor 20 is stopped, it is possible to prevent the entire subordinate system from being swung backward owing to the inertia energy.

In order to ensure this effect, the rotation velocities of the stepping motor 10 are continuously changed between before and after the operation modes are switched. That is to say, the micro step drive velocity immediately after the operation mode has been switched into the first operation mode M1 is equal to the target velocity at the position P5 in the second operation mode M2.

From the position P5 on, the motor 10 is gradually decelerated by the micro step drive in the first operation mode M1 until the motor 10 reaches the target position PT.

The above-described control operation not only enables a high-resolution control of the transportation to the target position PT but also considerably reduces the impact vibration when the stepping motor 10 is stopped.

In the above-described example, the stepping motor 10 is rotated in a clockwise direction. Similar description is applicable to a case where the stepping motor 10 is rotated in a counterclockwise direction.

As is clear from the foregoing description, the following effects can be attained in this example.

First, by switching the operation modes of the control section 50 during a series of transportation operations of the stepping motor 10 (e.g., by transporting the stepping motor 10 at a high velocity in the second operation mode M2 as a closed loop mode and then micro-step driving the motor in the first operation mode M1), a high resolution is realized for the stepping motor 10. Consequently, a high-velocity transportation and a high-resolution positioning can be simultaneously realized.

The resolution of the stepping motor 10 can be determined by the micro step drive independent of the number of magnetic poles of the rotor 20. Thus, it is possible to set the number of magnetic poles of the rotor 20 at a sufficiently small value for improving the high-velocity rotation ability and the efficiency of the motor when the motor is driven in the second operation mode M2, while maintaining a satisfactory resolution.

Second, the control section 50 selectively uses the operation modes depending upon the transportation amount of the stepping motor 10 to the target position thereof. Specifically, the control section 50 drives the stepping motor 10 only in the first operation mode M1 at the time of a short distance transportation when the transportation amount is smaller than a predetermined value, and drives the stepping motor 10 by switching the second operation mode M2 and the first operation mode M1 when the transportation amount is equal to or larger than the predetermined value. Consequently, it is possible to perform an optimum control appropriate for the transportation amount of the stepping motor 10 by avoiding the complicated switching of controls at the time of the short distance transportation.

Third, it is possible to prevent the impact vibration from being generated in the drive transmission system of the output of the stepping motor 10. When the acceleration operation of the stepping motor 10 is started, the control section 50 micro-step drives the stepping motor 10 in the first operation mode M1. Then, after the backlash generated in the drive transmission system is removed, the operation mode is switched into the second operation mode M2, thereby accelerating the stepping motor 10. Thus, it is possible to prevent the impact vibration from being generated in the drive transmission system owing to the backlash at the time of the acceleration.

Moreover, the control section 50 also changes the sequence of command values to be provided for the drive section 40 and reduces the drive current to be supplied to the stepping motor 10 before the operation state of the stepping motor 10 is switched from the acceleration operation into the deceleration operation. Thus, it is also possible to prevent the impact vibration from being generated in the drive transmission system owing to the backlash at the time of the deceleration.

Furthermore, before the motor is stopped, the excitation current is supplied to the stators 32 and 34 such that the rotation position of the rotor 20 at the instant that the operation mode of the control section 50 is switched from the second operation mode M2 into the first operation mode M1 is substantially matched with the stability point of the rotor 20 at the same instant at during the micro step drive. Consequently, it is possible to reduce the deceleration force which has been applied on the rotor 20 to a very small value before the motor is stopped, to prevent a swing back caused by the inertia energy of the entire subordinate system, and to prevent the impact vibration from being generated in the drive transmission system when the stepping motor 10 is stopped.

As can be understood, in this example, a high position control resolution, a high-velocity rotation ability and a low vibration can be simultaneously realized by a simple configuration for a stepping motor.

In this example, a two-phase PM type stepping motor having two-phase excitation coils has been illustrated. However, the applications of the present invention are not limited thereto. In general, in the case of using a stepping motor in which the magnetic pole period angle of a rotor is $\theta°$ and excitation coils have N phases (where N is an integer equal to or larger than two and does not include an inverted phase), if an encoder outputting detection signals on N channels, where the respective output signals have a period angle of $\theta°$ and have phases different from each other by an angle of $\theta/N°$, is used, the same effects can be attained. In addition, the type of the stepping motor is not limited to a PM type using a permanent magnet for a rotor. Alternatively, a stepping motor of a VR type using a soft magnetic member is also applicable.

Furthermore, in this example, a method for applying a predetermined lead angle relationship to the outputs of an encoder and the excitation switching timing of the stators has been described for a case where the stepping motor is driven in a two-phase excitation when the control section is in the second operation mode M2. However, in general, in the case where a control section drives a stepping motor in a P-phase excitation (where P is a natural number equal to or smaller than N and does not include an inverted phase) in the second operation mode M2, it has only to set the stability point where the rotor is stabilized when the stepping motor is driven in the P-phase excitation and the rotation position of the rotor when the output signal phases of an encoder are varied such that these two positions are substantially matched with each other.

EXAMPLE 2

Hereinafter, the second example of the present invention will be described with reference to FIGS. 5 and 6.

Figure 5:
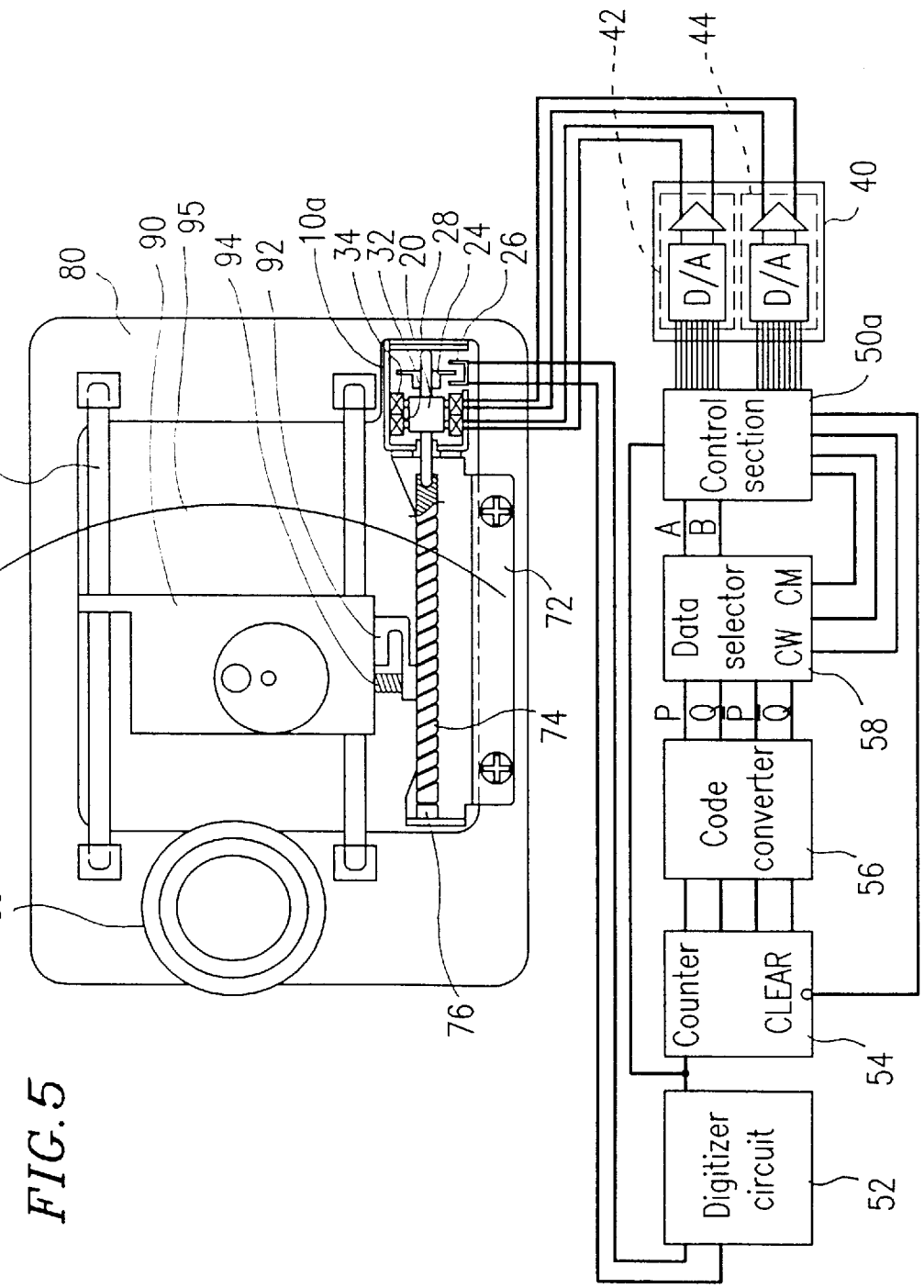
FIG. 5 is a view showing a configuration of an optical disk drive apparatus as an exemplary stepping motor controller in a second example of the present invention.

FIG. 5 is a schematic view showing an exemplary configuration of an optical disk drive apparatus to which the second example of the present invention is applied.

In FIG. 5, the drive section 40, the current drivers 42 and 44, the flange 72, the lead screw 74, the bearing 76, the chassis 80, the guide shaft 82, the spindle 85, the head 90, the nut piece 92, the spring 94 and the optical disk 95 are the same as those used in the first example. A control section 50a includes the below-described components, in addition to the components of the control section 50 of the first example.

A stepping motor 10a is also of a two-phase PM type, and the configurations of the rotor 20, the A-phase stator 32 and the B-phase stator 34 are the same as those in the first example. A light blocking plate 24 in which slits are provided at an angular period of 4.5° is fixed on the axis of the rotor 20. The value of 4.5° is determined as the angular period of the slits of the light blocking plate 24 so as to be 1/L (where L is an integer equal to or larger than 2, e.g., 1/16 in this case) of the angular period of 72° at which the magnetic poles are formed in the magnet of the rotor 20. In particular, since the number of phases of the stepping motor 10a is two, the angular period of the slits is also selected so as to be $1/2^L$ (where L is an integer, i.e., $1/16=1/(2^4)$. A photo-sensor 26 is a transmission type photo-sensor including an LED on the light-emitting side thereof and a photo-transistor on the light-receiving side thereof and supplies output signals in accordance with the presence and absence of the slits of the light-blocking plate 24. The photo-sensor 26, together with the light-blocking plate 24, are housed in a housing 28 so as not to be broken during the handling thereof or not to collect dust degrading the performance thereof.

The output of the photo-sensor 26 is digitized by a digitizer circuit 52. The digitizer circuit 52 does not output HIGH/LOW signals simply by comparing the output of the photo-sensor 26 with a certain reference value, but is configured to switch the outputs between HIGH and LOW only when a value has been transferred from one reference value to another reference value, thereby preventing an erroneous operation owing to a chattering. The output of the digitizer circuit 52 is input to the control section 50a on the one hand and is also input to a hexadecimal counter 54 on the other hand. The count of the counter 54 increments by one every time one pulse of signal is input from the digitizer circuit 52 thereto. A set of cyclic values of 0 to 15 outputs as four-bit binary numbers. On the other hand, when a clear signal is output from the control section 50a to the counter 54, the value of the counter 54 is cleared to be zero. The output of the counter 54 is code-converted by a code converter 56 having four inputs and four outputs. The truth values of the code converter 56 are shown in Table 1. The four outputs of the code converter 56 will be referred to as "P", "Q", "inverse of P (P bar)" and "inverse of Q (Q bar)", respectively. It is noted that the input values shown in Table 1 are represented as decimal numbers, not as actual four-bit binary numbers.

TABLE 1

| Input Value | Output Value | | | |
|---|---|---|---|---|
| | P | Q | Inverse of P | Inverse of Q |
| 0 | 0 | 0 | 1 | 1 |
| 1 | 0 | 0 | 1 | 1 |
| 2 | 1 | 0 | 0 | 1 |
| 3 | 1 | 0 | 0 | 1 |
| 4 | 1 | 0 | 0 | 1 |
| 5 | 1 | 0 | 0 | 1 |
| 6 | 1 | 1 | 0 | 0 |
| 7 | 1 | 1 | 0 | 0 |
| 8 | 1 | 1 | 0 | 0 |
| 9 | 1 | 1 | 0 | 0 |
| 10 | 0 | 1 | 1 | 0 |
| 11 | 0 | 1 | 1 | 0 |
| 12 | 0 | 1 | 1 | 0 |
| 13 | 0 | 1 | 1 | 0 |
| 14 | 0 | 0 | 1 | 1 |
| 15 | 0 | 0 | 1 | 1 |

As can be seen from Table 1, each output of the code converter 56 is obtained by dividing a corresponding output of the digitizer circuit 56 such that the former output becomes 1/16 of the latter output. The phase of the P output of the code converter 56 is different from that of the Q output thereof by the four output periods of the digitizer circuit 52. The other two outputs of the code converter 56 are obtained by inverting the P output and the Q output, respectively.

A data selector 58 selects two out of the four inputs P, Q, inverse of P and inverse of Q and retrieves them as two outputs A and B. A three-bit select signal is input to the data selector 58, which performs a selection based on the value of the signal. The three-bit contents of the select signal are rotation direction data CW (one bit) and motor initial state data CM (two bits). The rotation direction data CW of "1" is provided when the stepping motor 10a is rotated in the clockwise direction, whilst the rotation direction data CW of "0" is provided when the stepping motor 10a is rotated in the counterclockwise direction. The motor initial state data CM represents the excitation state of the stepping motor 10a immediately before the second operation mode M2 is started.

Herein, the description will be advanced while supposing that the stepping motor 10a is held in a one-phase excitation state and then the control section 50a is switched into the second operation mode M2.

The one-phase excitation states include the four states of: a state where only the A-phase stator 32 is excited in the positive direction; a state where only the B-phase stator 34 is excited in the positive direction; a state where only the A-phase stator 32 is excited in the negative direction; and a state where only the B-phase stator 34 is excited in the negative direction. The values of CM become 0, 1, 2 and 3 in the above-described order depending upon from which of the four states the operation mode has been switched into the second operation mode M2 for performing a drive. The correspondence among the values of the select signals CW and CM and the input and output signals selected by the data selector 58 is shown in Table 2. It is noted that the values of CM will be hereinafter represented as decimal numbers, not as the actual two-bit binary numbers.

TABLE 2

| Select Signal | | Correspondence | |
|---|---|---|---|
| CW | CM | Output A | Output B |
| 1 | 0 | P | Q |
| 1 | 1 | Q | Inverse of P |
| 1 | 2 | Inverse of P | Inverse of Q |
| 1 | 3 | Inverse of Q | P |
| 0 | 0 | Q | P |
| 0 | 1 | P | Inverse of Q |
| 0 | 2 | Inverse of Q | Inverse of P |
| 0 | 3 | Inverse of P | Q |

The control operation of the stepping motor in the optical disk drive apparatus having the above-described configuration will be described with reference to FIG. 6. Fundamentally, the control operation described in the first example is similarly performed in the second example. Herein, the contents overlapping with those described in the first example will be omitted.

Figure 6:
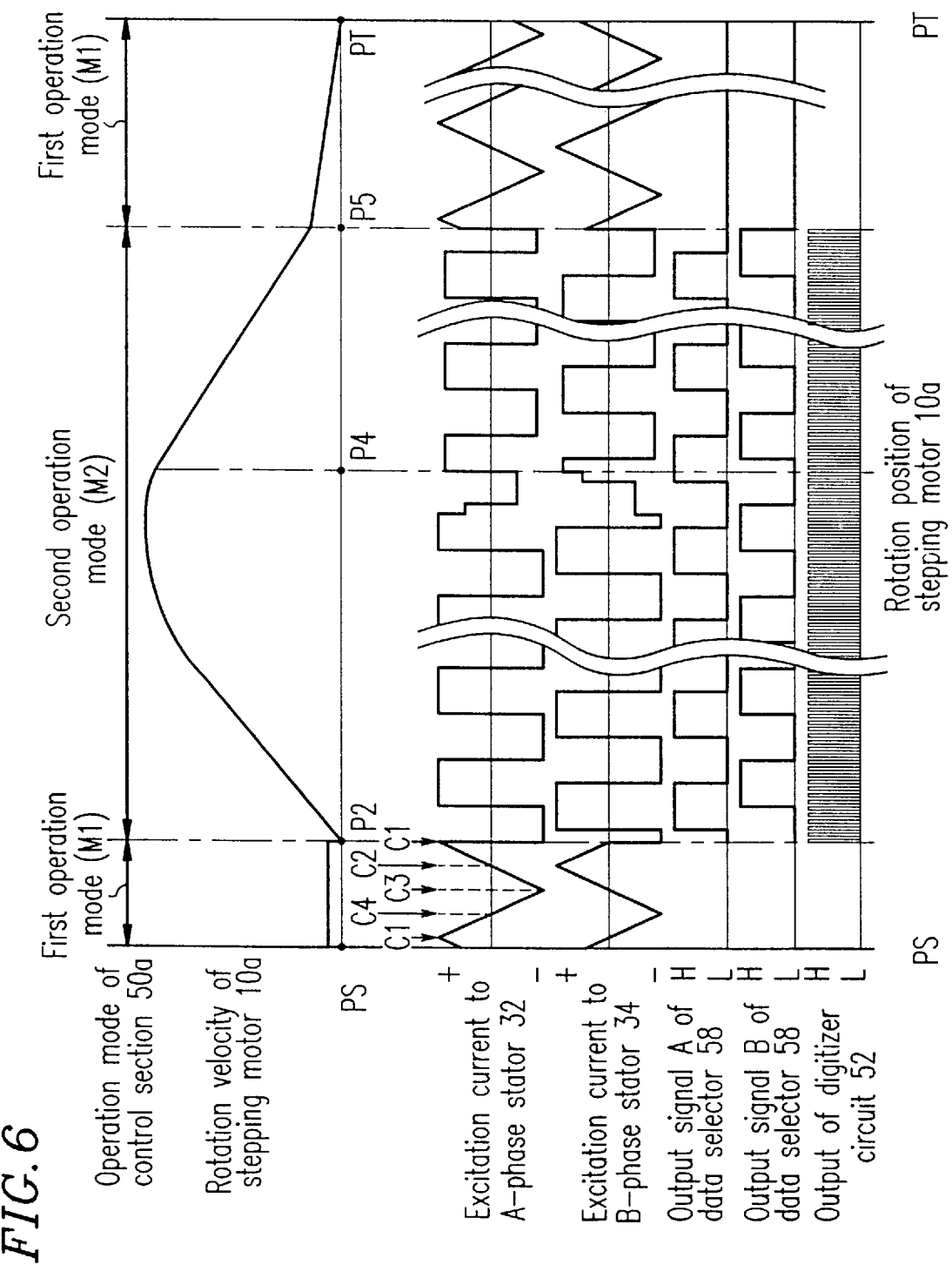
FIG. 6 is a diagram for illustrating the transportation control operation of a stepping motor 10a in the stepping motor controller in the second example of the present invention.

FIG. 6 is a diagram illustrating the control operation of the stepping motor.

In FIG. 6, the axis of the abscissas represents the rotation positions of the stepping motor 10a. On the other hand, the axis of the ordinates represents the operation modes of the control section 50a, the rotation velocities of the stepping motor 10a, the excitation current to be supplied to the stators 32 and 34, the output signals of the data selector 58 and the output signals of the digitizer circuit 52 at the respective rotation positions, respectively.

First, the control section 50a determines the rotation direction of the stepping motor 10a. Herein, the rotation direction is assumed to be clockwise. Next, the stepping motor 10a is rotated by the micro step drive in the first operation mode M1 until the motor reaches a position P2 at which any of the four one-phase excitation states as indicated by the arrows C1 to C4 is established. Herein, C1 is a state where only the A-phase stator 32 is excited in the positive direction, C2 is a state where only the B-phase stator 34 is excited in the positive direction, C3 is a state where only the A-phase stator 32 is excited in the negative direction and C4 is a state where only the B-phase stator 34 is excited in the negative direction.

After the one-phase excitation state is held for about 1 or 2 ms, the control section 50a outputs a clear signal to the counter 54, thereby setting the output value at zero. The control section 50a also outputs the rotation direction data CW and the motor initial state data CM to the data selector 58. Herein, since the rotation direction of the stepping motor 10a is clockwise, CW=1 and CM is set at "0" when the motor is actuated from the state C1. These values are continuously held until the operation mode is switched from the second operation mode M2 into the first operation mode M1 later.

In the case where the values of CW and CM have respectively been set at "1" and "0", as described above, the output signals A and B of the data selector 58 are equal to the outputs P and Q of the code converter 56, respectively, as can be seen from the correspondence shown in Table 2. In addition, in accordance with the truth table shown in Table 1, when the counter 54 is cleared, both the values A and B are "0" (i.e., the LOW state). Starting from this phase state, the value of the output signal A rises to "1" (HIGH) in response to the second-period pulse of the digitizer circuit 52 and the state of the output signal A periodically changes every time eight pulse periods of the digitizer circuit 52 have passed from then on. Similarly, the value of the output signal B rises to "1" in response to the sixth-period pulse of the digitizer circuit 52 and the state of the output signal B periodically changes every time eight pulse periods of the digitizer circuit 52 have passed from then on. That is to say, the output of the digitizer circuit 52 is divided by the counter 54, the code converter 56 and the data selector 58 to be 1/16 so that the output signals A and B are produced. Thus, it can be understood that the output signals A and B start from the output state in which the counter has been cleared by the control section 50a and have phases which are shifted from each other by an angle corresponding to the four periods of the outputs of the digitizer circuit 52.

At this point, the control section 50a employs the second operation mode M2 and provides command values to the drive section 40 in accordance with the values of the two output signals A and B of the data selector 58. The output signals A and B of the data selector 58 respectively become the signals having the same timings as those of the output signals of the A-phase sensor 32 and the B-phase sensor 34 as described in the first example. Thus, in totally the same way as in the first example, the control section 50a provides the command values so as to excite the B-phase stator 34 in the positive/negative directions in accordance with the values 1/0 of the output signal A and to excite the A-phase stator 32 in the positive/negative directions in accordance with the values 1/0 of the output signal B during the acceleration operation.

From the position P4 on, a deceleration operation is performed. Also, in totally the same way as in the first example, the control section 50a excites the A-phase stator 32 in the positive/negative directions in accordance with the values 1/0 of the output signal A and excites the B-phase stator 34 in the positive/negative directions in accordance with the values 1/0 of the output signal B.

The control section 50a continues the deceleration operation while controlling the current amount A2 such that a position precision and a velocity precision within predetermined ranges can be attained at the position P5 where the second operation mode M2 is completed. In this case, the rotation velocity of the stepping motor 10a has been obtained from an interval time of the output pulses of the digitizer circuit 52 which have been input to the control section 50. Thus, the velocity can be detected every time the motor has rotated 4.5° and the time required for sampling can be shortened to 1/16, for example, as compared with the first example. Consequently, a high-precision velocity control can be performed over a wide control band.

After the stepping motor 10a has passed the position P5, the control section 50a switches the operation mode from the second operation mode M2 into the first operation mode M1 when the value of the output signal A or B of the data selector 58 changes for the first time. After the switching, the excitation current to the stators 32 and 34 is controlled in the same way as in the first example and the micro step drive is performed until the motor 10a reaches the target position PT.

In the foregoing example, a case where the stepping motor 10a is rotated in the clockwise direction has been described. Similar description is applicable to a case where the motor is rotated in the counterclockwise direction. In such a case, the control section 50a has only to provide a value of "0" as the rotation direction data CW for the data selector 58. Also, the description has been made while assuming that the motor initial state at the time of the actuation in the second operation mode M2 is the state C1. In the cases where the motor is actuated from the states C2 to C4, the control section 50a has only to provide values of "1" to "3", respectively, as the motor initial state data CM.

It is noted that the assembly comprising the light blocking plate 24, the photo-sensor 26 and the digitizer circuit 52 in the second example corresponds to the encoder recited in the claims of the present application.

Furthermore, the number of excitation coils of the stepping motor is assumed to be N (where N is an integer equal to or larger than 2 and does not include inverted phases) and the ratio of the rotation angular period of the output signal of the encoder to the angular period of the magnetic poles of the rotor is assumed to be K (where K is an integer equal to or larger than 2). By generalizing the relationship between N and K, K is assumed to be a multiple of N (i.e., K=M×N, where M is an integer equal to or larger than 2). Then, the configuration of the present example can be generalized by assuming that a divider section generates a detection signal by dividing the output signal of the encoder to be 1/K and that a number N of channels are produced by shifting the phases of the respectively divided detection signals by an angle corresponding to the M/2 periods of the output signal of the encoder.

As is clear from the foregoing description, the following effects can be attained in this example.

First, an adjustment for matching the phase relationship between the stepping motor and the encoder can be eliminated totally. No matter what type of relative relationship is established among the angular phase of the magnetic pole position of the rotor 20, the angular phase of the slit position of the light-blocking plate 24, and the angular phase of the mount position of the photo-sensor 26, if a detection signal is generated by dividing the output signal of the encoder (which has an angular period K times as fine as the angular period at which the magnetic poles of the rotor 20 are formed) to be 1/K, while regarding a state where the stepping motor 10a is in a predetermined excitation state as a reference state, the timings of the detection signal and the excitation of the stepping motor can be matched with each other. By omitting an adjustment process for matching the phase relationship between the stepping motor and the encoder in this manner, the assembly process can be simplified totally.

Second, the number of sensors required for the encoder can be reduced. Since the value of K is set at a multiple of N (i.e., the number of phases of the excitation coils) and the output signals on N channels having respectively different phases are produced by the divider section, only one photosensor 26 can generate a plurality of output signals having respectively different phases on N channels.

Thus, as compared with the case of using a plurality of sensors, the costs required for the sensors themselves and the wires can be saved. In addition, various factors causing the degradation in precision such as a mount precision among the sensors, the temperature properties among the sensors, and a variation in frequency characteristics thereof can be totally eliminated. Thus, a stepping motor can be driven in a highly reliable and stable manner.

Third, the precision in detecting the rotation angle and the rotation velocity of a stepping motor can be improved. By inputting the output signal of the encoder directly to the control section 50a separately from the divider section, the rotation angle and the rotation velocity can be detected with a high precision and a motor can be controlled with a high precision over a wide control band without increasing the costs at all as compared with the case of detecting the angle and the velocity based on the period signals to be determined by the angular period at which the magnetic poles of the rotor 20 are formed. Particularly when the motor is rotated at a low rotation number, the time at which the velocity signal is output can be advantageously earlier.

As can be understood from these effects, in this example, a stepping motor can be controlled with a high precision and in a highly reliable manner under a simplified configuration in which no adjustment process is required.

In this example, the value of the counter 54 is varied with the leading edge of the output signal of the digitizer circuit 52. However, if the controller is configured such that the values of the counter 54 are varied at both the leading edge and the trailing edge of the output signal of the digitizer circuit 52, the precision in matching the phases can be doubled.

Moreover, in this example, the divider section is implemented as a circuit configuration made up of the counter 54, the code converter 56 and the data selector 58. Alternatively, the divider section may be implemented by software algorithms, for example, by performing program processing in the DSP within the control section 50 in the first example.

Furthermore, in this example, the divider section generates a detection signal by always dividing the output of the digitizer circuit 52 to be 1/16. Alternatively, a lead angle may be provided by varying the count number at the time of division during a high-velocity rotation, for example. The higher the rotation velocity becomes, the more different the torque angle becomes from an ideal angle of 90°. Thus, in this example, the torque properties in the high-velocity rotation region are improved by utilizing a configuration in which a lead angle of 45° is provided beforehand in the entire rotation region. However, if the count number at the time of division is adjusted in accordance with the rotation number, more preferable torque properties are applicable. Specifically, if a detection signal is generated by subjecting the output of the digitizer circuit 52 not to a 1/16 division but to a 1/15 division only once at the instant that the rotation number reaches a first predetermined value (e.g., 2000 rpm), then a lead angle of 23° is provided. Subsequently, if a detection signal is generated by subjecting the output of the digitizer circuit 52 not to the 1/16 division but to a 1/15 division only one more time at the instant the rotation number reaches a next predetermined value (e.g., 4000 rpm), then a lead angle of 23° is further provided. The more preferable torque properties can be realized by setting the program in the DSP within the control section 50 in such a manner. Conversely, at the time of deceleration, the lead angle is reduced by generating a detection signal by subjecting the output of the digitizer circuit 52 not to the 1/16 division but to a 1/17 division twice when the rotation number reaches respective predetermined values (e.g., 4000 rpm, 2000 rpm).

In order to provide a lead angle, a detection signal may be delayed by adjusting the circuit configuration. However, a delay time is a function of a rotation number and a lead angle. Thus, even when a constant lead angle is provided, the delay time must always be calculated in accordance with the rotation number so that the control becomes adversely complicated. On the other hand, since the lead angle can be directly controlled in the above-exemplified method, the control load can be advantageously relieved.

Furthermore, in this example, the stepping motor 10a is rotated by the micro step drive from the start position PS until the position P2. However, the drive method is not limited thereto. Since the stepping motor 10a has only to be in a predetermined excitation state before the second operation mode M2 is started at the position P2, the stepping motor 10a may be naturally rotated by a different drive method such as a one-phase excitation drive from the start position PS until the position P2.

EXAMPLE 3

Hereinafter, the third example of the present invention will be described with reference to FIG. 7.

Figure 7:
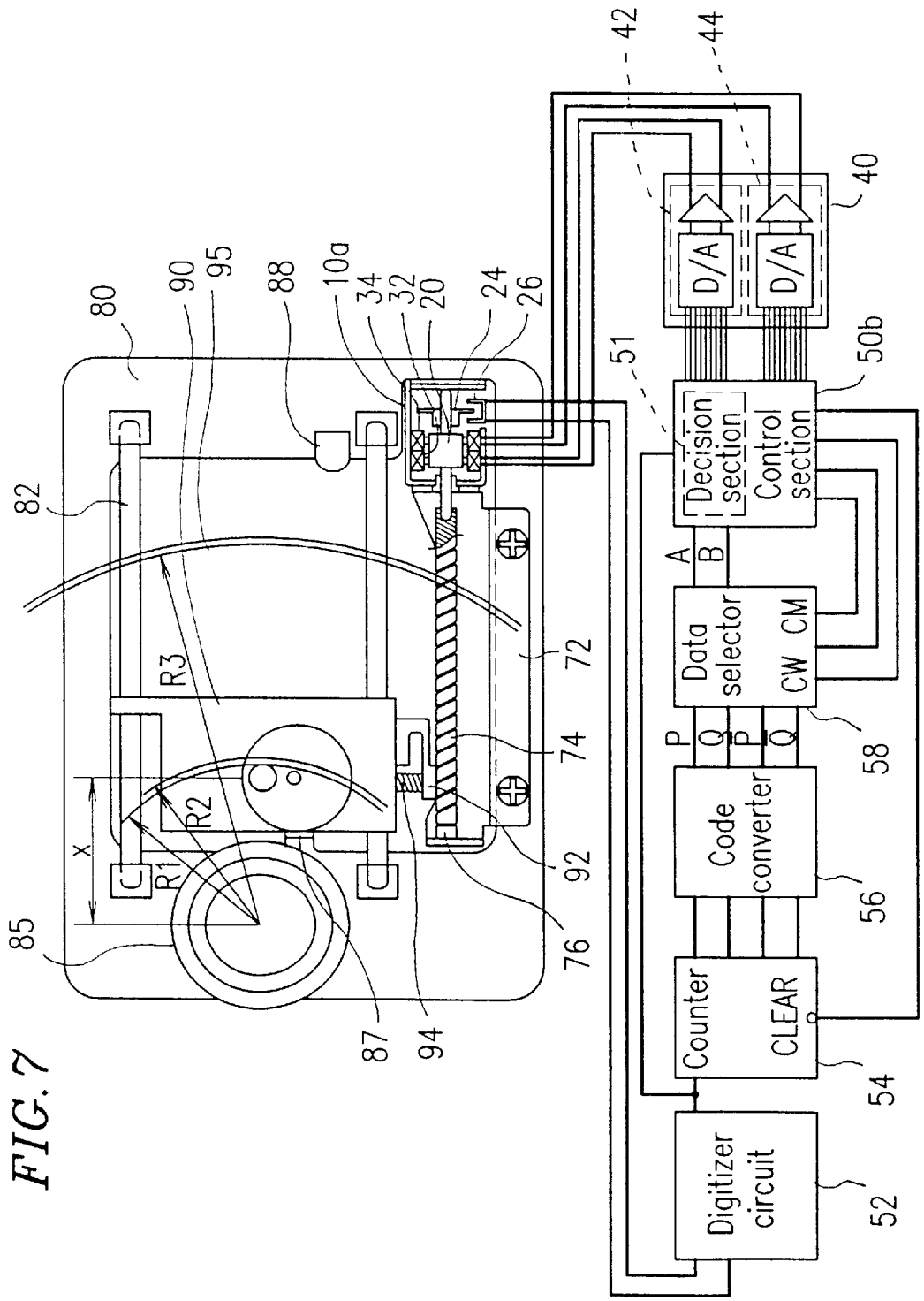
FIG. 7 is a view showing a configuration of an optical disk drive apparatus as an exemplary stepping motor controller in a third example of the present invention.

FIG. 7 is a schematic view showing an exemplary configuration of an optical disk drive apparatus to which the third example of the present invention is applied.

In FIG. 7, the stepping motor 10a, the drive section 40, the current drivers 42 and 44, the digitizer circuit 52, the counter 54, the code converter 56, the data selector 58, the flange 72, the lead screw 74, the bearing 76, the chassis 80, the guide shaft 82, the spindle 85, the head 90, the nut piece 92, the spring 94 and the optical disk 95 are the same as those used in the second example. A control section 50b includes the below-described components, in addition to the components of the control section 50a of the second example.

A stopper 87 is formed by bending a part of the chassis 80 and comes into contact with the head 90, thereby restricting the movement range of the head 90 toward the inner periphery direction of the optical disk 95. The stopper 87 is used as a reference for positioning the head 90 in the initial state (e.g., at the time of power supply). And the stopper 87 is formed with a high precision such that a distance x between the center of the optical disk 95 and the center of the light beam spot of the head 90 becomes a predetermined value when the stopper 87 is in contact with the head 90. The value of x is set at a value smaller than a radius R2 of the innermost circumference of an information recording area on the optical disk 95. It is noted that a lead-in area is defined between R1 and R2 and the information recording area is defined between R2 and R3 on the optical disk 95. When the head 90 starts a readout operation on the optical disk 95, the center of the light beam spot of the head 90 is required to be located at any position within the lead-in area.

A stopper 88 is made of an elastic material such as rubber and comes into contact with the head 90, thereby restricting the movement range of the head 90 toward the outer periphery direction of the optical disk 95. Since the hardness of the stopper 88 is set to be lower than that of the stopper 87, the stopper 88 is provided so as to have a higher impact absorbing ability at the time of contact with the head 90 though the positioning precision thereof is low.

The control section 50b includes a decision section 51. The decision section 51 determines whether or not the output signal of the digitizer circuit 52 has been varied within a period specified by the control section 50b. If there is a variation, the decision section 51 returns a value of "1" to the control section 50b. On the other hand, if there is no variation, the decision section 51 returns a value of "0" to the control section 50b.

In the case where only the leading edge is detected, the output signal of the digitizer circuit 52 has an angular resolution of about 4.5°. On the other hand, in the case where both the leading edge and the trailing edge are detected, the output signal of the digitizer circuit 52 has an angular resolution of about 2.3°. Herein, the angular resolution of an encoder is assumed to be about 4.5°, while supposing that only the leading edge is to be detected. On the other hand, in the case where the stepping motor 10a is micro-step driven by the closed loop control, one step corresponds to about 0.6°. Thus, if the motor is driven in eight steps or more, then the stepping motor 10a rotates about 4.5° (i.e., the angular resolution of the encoder) or more, supposing loss of synchronism has not been caused. Thus, if the output signal of the digitizer circuit 52 has not been varied during this period of time, it can be determined that the stepping motor 10a is out of control. In this example, when the control section 50b is in the first operation mode M1, the decision section 51 is made to determine whether or not the output signal of the digitizer circuit 52 has been varied with respect to each unitary angular variation, while regarding a micro step drive having 20 steps (about 1.2°) as a unit. In response to the value returned by the decision section 51, a control operation to be performed is determined.

Hereinafter, the initial operation of the optical disk drive apparatus having such a configuration when power is supplied thereto will be described. The objective of this initial operation is to precisely position the head 90 (which is initially located at an arbitrary position), regarding the position of the stopper 87 as a reference. In this case, immediately before the head 90 comes into contact with the stopper 87 having a higher hardness, the head 90 is moved at a low velocity so as not to generate a large impact load. In this case, the lower the velocity becomes, the smaller the impact load becomes. However, if the head 90 is initially located in the vicinity of the outer periphery of the optical disk 95, then it takes a relatively long time to make the head 90 come into contact with the stopper 87. In order to avoid such a situation, a coarse positioning is first performed by contacting the head 90 with the soft stopper 88 and then the head 90 is contacted with the stopper 87.

In the initial operation, first, the control section 50b selects the first operation mode M1 and transports the head 90 toward the outer periphery direction of the optical disk 95 by the micro step drive. The transportation velocity is set at about 5 to about 30 mm/s and the amount of the excitation current is set to generate torque to such a degree as not to cause significant loss of synchronism during a normal transportation operation but to cause loss of synchronism when the head 90 is restricted by the stopper 88. The output of the digitizer circuit 52 is input to the decision section 51 during this transportation. Based on a timing signal output from the control section 50b every time a micro step drive having 20 steps has been performed once, the decision section 51 determines that loss of synchronism has been caused if the output of the digitizer circuit 52 has not varied during a period between a time when a timing signal was input and a time when the next timing signal was input. When the position of the head 90 is restricted by the stopper 88, the decision section 51 detects the loss of synchronism of the stepping motor 10a and returns a value of "0" to the control section 50b.

In response thereto, the control section 50b reverses the rotation direction of the stepping motor 10a and transports the head 90 by a predetermined distance at a high velocity toward the inner periphery direction of the optical disk 95 in the second operation mode M2. The predetermined distance is a distance which has been set to be slightly shorter than the transportation amount from the state where the head 90 is positioned at the stopper 88 and the state where the head 90 is positioned at the stopper 87 in expectation of an error. Thereafter, the control section 50b transports the head 90 over a short remaining distance at a low velocity of about 1 mm/s until the head 90 is positioned at the stopper 87. In this case, the amount of the excitation current is also set to generate torque to such a degree as not to cause significant loss of synchronism during a normal transportation operation but to cause loss of synchronism when the head 90 is restricted by the stopper 87. Then, when the position of the head 90 is restricted by the stopper 87, the decision section 51 detects the loss of synchronism of the stepping motor 10a and returns a value of "0" to the control section 50b. In response thereto, the control section 50b stops the stepping motor 10a, and thus the positioning of the head 90 by the stopper 87 is completed.

Finally, regarding this position as a reference, the control section 50b transports the head 90 again over a predetermined distance toward the outer periphery direction of the optical disk 95 in the first operation mode M1. This predetermined distance is set such that the center of the light beam spot of the head 90 is located exactly over the lead-in area of the optical disk 95. For example, in a CD, the lead-in area is defined by the radii of 23 mm and 25 mm of the disk. Assuming the center of the light beam spot of the head 90 when the head 90 is in contact with the stopper 87 to be denoted by x=22±0.2 mm, the head 90 is required to be moved over 2 mm.

Furthermore, assume a case where information is reproduced from a disk such as a DVD having a different lead-in area (defined by the radii of 22.6 mm and 24 mm) from that of a CD in a compatible manner. In such a case, supposing the distance x to be equal, it is necessary to set the transportation distance of the head 90 at 1.5 mm such that the center of the light beam spot is located over a range defined by the radii of 23 mm and 24 mm where the lead-in area specified by the DVD standard overlaps with that specified by the CD standard. Alternatively, in the case where the type of an optical disk can be identified beforehand because the disk is placed in a cartridge or the like reason, the center of the light beam spot of the head 90 may be transported to an initial position optimized for each type of disk by varying the transportation distance depending upon the type of the disk. After the center of the light beam spot of the head 90 has been transported into the lead-in area in such a manner, the head 90 reads out information from the optical disk 95.

As is clear from the foregoing description, the following effects can be attained in this example.

First, the control operation can be switched by rapidly determining whether the motor under drive is actually moving or stopped. That is to say, the control section 50*b* directly specifies a rotation angle of the stepping motor 10*a* by an open loop control, the encoder detects an actual rotation angle during the rotation, and a decision section 51 compares these angles with each other, thereby detecting the loss of synchronism of the stepping motor 10*a* with a high precision. As a comparative example, in a conventional motor control method in which an encoder is attached to a DC motor, for example, it is necessary to examine the variation in outputs of the encoder by a timer management in which current is continuously supplied to the motor for a certain period of time, in order to determine whether or not the head 90 has come into contact with the stopper 87. Thus, the response speed of such a control method is slow. In addition, if the head 90 is driven at a low velocity, it is difficult to determine whether or not the head 90 has come into contact with the stopper 87 with certainty. In contrast, in this example, the velocity of the head 90 can be arbitrarily set and the contact between the head 90 and the stopper 87 can be determined in a short time under an arbitrary velocity condition. Naturally, the present invention is applicable not only to the decision of the contact with the stopper, but also to any other case where it is effective to determine whether or not loss of synchronism has been caused.

Second, since the head 90 is contacted with the stopper 87 having a higher hardness and a higher positioning precision at a low velocity after a coarse positioning has been performed by contacting the head 90 with the stopper 88 having a lower hardness, it is possible to simultaneously realize a high-precision positioning of the head 90, a low impact and a low noise at the time of the contact and a reduction in time required for the positioning.

As is apparent from the foregoing description, the stepping motor controller of the present invention performs a control by switching a first operation mode suitable for a high-precision positioning and a second operation mode suitable for a high-velocity transportation during a series of transportation operations, thereby simultaneously realizing a high-precision positioning and a high-velocity transportation for a stepping motor.

Moreover, the switching point where the second operation mode is switched into the first operation mode is substantially matched with the stability point where a rotor is electromagnetically stabilized and rests in a micro step drive, thereby considerably reducing a swing back at the time of switching the operation modes.

Furthermore, in the second operation mode, the acceleration is reduced before the operation state of the stepping motor is switched from the acceleration operation into the deceleration operation, thereby smoothing a velocity variation from the acceleration into the deceleration and considerably reducing an impact vibration owing to the velocity vibration.

Consequently, the present invention can provide a stepping motor controller simultaneously realizing a high-precision positioning, a high-velocity transportation and a low vibration for a stepping motor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A stepping motor controller comprising:

a stepping motor including a rotor and an excitation coil;

a drive section for supplying multiple-stage drive current to the excitation coil in response to an input command value, thereby enabling a micro step drive;

a control section for controlling the stepping motor by varying the command value to be provided for the drive section; and a position detection control section for generating a detection signal in accordance with a rotation position of the rotor, wherein the control section switches two operation modes of a first operation mode and a second operation mode, the control section varies the command value to be provided for the drive section based on a timing generated by the control section itself in the first operation mode, and the control section varies the command value to be provided for the drive section based on a timing corresponding to the detection signal generated by the position detection control section in the second operation mode, thereby controlling the stepping motor, and wherein the control section switches the two operation modes during a series of transportation operations for transporting the stepping motor from a start position to a target position, and the control section makes the stepping motor perform a coarse operation in the second operation mode and then switches the second operation mode into the first operation mode, thereby performing a micro step drive.

2. A stepping motor controller according to claim 1, wherein the control section selectively uses the two operation modes depending upon a transportation amount over which the stepping motor is transported from the start position to the target position, the control section drives the stepping motor only in the first operation mode if the transportation amount is smaller than a predetermined value, and the control section drives the stepping motor by switching between the second operation mode and the first operation mode if the transportation amount is equal to or larger than the predetermined value.

3. A stepping motor controller according to claim 1, wherein the control section switches the second operation mode into the first operation mode based on a time when a phase of an output signal of the position detection control section is varied, and wherein a rotation position of the rotor at an instant of the switching is substantially matched with a stability point at which the rotor is electromagnetically stabilized and rests in the micro step drive.

4. A stepping motor controller according to claim 1, wherein when the stepping motor is driven in the second operation mode, the control section provides a first sequence of command values for the drive section, thereby accelerating the stepping motor at a first acceleration, and subsequently provides a second sequence of command values for the drive section, thereby accelerating the stepping motor at a second acceleration substantially lower than the first acceleration, and then provides a third sequence of command values for the drive section, thereby decelerating the stepping motor.

5. A stepping motor controller comprising:

a stepping motor including a rotor and a plurality of excitation coils;

a drive section for supplying drive current to the respective excitation coils in response to an input command value;

a control section for step driving the stepping motor by varying the command value to be provided for the drive section;

a position detection control section for outputting a detection signal by detecting a rotation angle of the rotor at a resolution of $\alpha°$ or less; and a decision control section for determining whether or not the stepping motor is out of synchronism, wherein the control section varies the command value corresponding to a rotation of the stepping motor by the resolution of $\alpha°$ or more, and the decision control section determines whether or not the stepping motor is out of synchronism in accordance with a variation of the detection signal before and after the command value has been varied.

6. A stepping motor controller according to claim 5, further comprising:

a transported object to which a driving force is transmitted by the stepping motor so as to be transported via a predetermined route; and a stopper for coming into contact with the transported object, thereby limiting a transportation range of the transported object, wherein the control section drives the stepping motor in a direction in which the transported object is contacted with the stopper, and wherein after the decision control section has determined the loss of synchronism, the control section stops the drive of the stepping motor toward the direction or reverses the direction of the drive.

7. A stepping motor controller according to claim 5, further comprising:

a transported object to which a driving force is transmitted by the stepping motor so as to be transported via a predetermined route; and a first stopper and a second stopper for coming into contact with the transported object, thereby limiting a transportation range of the transported object, wherein the first and the second stoppers are provided so as to be spaced via a predetermined distance therebetween, a hardness of the first stopper being lower than a hardness of the second stopper, and wherein the control section controls the stepping motor in a direction in which the transported object is contacted with the first stopper, and wherein, after the decision control section has determined the loss of synchronism, the control section controls the stepping motor in a direction in which the transported object is contacted with the second stopper, and wherein, after the decision control section has determined the loss of synchronism again, the control section stops or reverses the drive of the stepping motor, and wherein a velocity of the transported object immediately before the transported object comes into contact with the second stopper is made lower than a velocity of the transported object immediately before the transported object comes into contact with the first stopper.

* * * * *